(12) United States Patent
Tamura et al.

(10) Patent No.: US 6,924,034 B2
(45) Date of Patent: Aug. 2, 2005

(54) COATED POLYAMIDE MOLDING PRODUCTS

(75) Inventors: Tsutomu Tamura, Ohtsu (JP); Yoshinobu Hanaoka, Ohtsu (JP); Tomohide Nakagawa, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 350 days.

(21) Appl. No.: 10/140,071

(22) Filed: May 8, 2002

(65) Prior Publication Data

US 2003/0008147 A1 Jan. 9, 2003

(30) Foreign Application Priority Data

May 8, 2001 (JP) ........................................ 2001-137743
Jun. 1, 2001 (JP) ........................................ 2001-167092

(51) Int. Cl.$^7$ .............................. B32B 5/22; B32B 5/16; B32B 27/00
(52) U.S. Cl. .................... 428/407; 428/474.4; 428/403; 428/220; 525/179; 525/420; 525/422; 524/484; 524/493; 524/494; 524/495
(58) Field of Search .............................. 428/474.4, 407, 428/403, 220; 525/420, 422, 432, 179; 524/449, 484, 493, 494–495

(56) References Cited

U.S. PATENT DOCUMENTS 6,534,583 B1 * 3/2003 Tamura et al. .............. 524/449

FOREIGN PATENT DOCUMENTS

| JP | 6-9878 | 1/1994 |
| JP | 7-11662 | 1/1995 |

* cited by examiner

Primary Examiner—P. Hampton Hightower
(74) Attorney, Agent, or Firm—Morrison & Foerster LLP

(57) ABSTRACT

It is disclosed that a coated polyamide molding product, characterized in that, a polyamide molding product obtained from a polyamide resin composition containing a polyamide resin (A), a thermoplastic resin composition (B) having functional groups reacting with the polyamide resin and, if necessary, an inorganic filler (C) is coated with a thermoplastic resin elastomer (D) which is compatible with the thermoplastic resin composition which is the above-mentioned component (B).

5 Claims, 1 Drawing Sheet

Unit: mm

COATED POLYAMIDE MOLDING PRODUCTS

BACKGROUND OF THE INVENTION

1. Field of the Invention

The present invention relates to a coated polyamide molding product in which strength, rigidity, gripping property, packing and sealing characteristics and vibration cushioning property are compatible by means of coating a soft thermoplastic resin elastomer on the surface of a molding product of polyamide resin having good strength, rigidity and shock resistance.

2. Description of the Related Art

With regard to a compounded molding product by a hard material and a soft material, a compounded molding has been carried out by a combination of materials of the same quality such as hard olefin material and soft olefin material followed by subjecting to a thermal fusion whereby various commercial products have been developed (e.g., *Nippon Gomu Kyokai Shi*, vol. 69, no. 9, p. 631 (1996) and *Purasuchikkusu*, vol. 48, no. 3, p. 30 (1997)). In a thermal fusion of different materials, the compatibility between/among the different materials is quite important and, in the case of a combination of the materials of the same quality, the thermal fusion can be done relatively easily. However, there is a disadvantage in a combination of such materials of the same quality that only very limited materials are able to be used and that the field of use is limited as well.

In the meanwhile, there has been a report where a general-purpose elastomer such as thermoplastic elastomer of a styrene type and thermoplastic elastomer of an olefin type is blended with an engineering elastomer having polar groups such as thermoplastic polyester elastomer and thermoplastic polyamide elastomer comprising polyether block amide and the resulting soft material is subjected to a thermal fusion with a hard material such as ABS, polycarbonate, Nylon and PBT (e.g., Japanese Patent Laid-Open No. 9878/1994, No. 11662/1995, etc.).

In such a method, however, there is used a specific soft material where a general-purpose thermoplastic elastomer is blended with a very expensive thermoplastic elastomer of a polyamide type or thermoplastic elastomer of a polyester type. Therefore, the product is an expensive specially-coated molding product and, in addition, a phase separation of the soft material may take place depending upon a combination of blending resulting in a defective part in the molding product and that is not preferred.

SUMMARY OF THE INVENTION

The present invention has been achieved on the background of such problems in the prior art and the object thereof is to manufacture a coated polyamide molding product having good thermally fusing property and good molding ability at a low cost by a combination of entirely different types of hard and soft materials comprising a polyamide resin having good strength and rigidity and a thermoplastic resin elastomer having a softness.

In order to solve the above-mentioned problems, the present inventors have carried out an intensive investigation and at last achieved the present invention. Thus, the present invention relates to ① a coated polyamide molding product, characterized in that, a polyamide molding product obtained from a polyamide resin composition containing a polyamide resin (A), a thermoplastic resin composition (B) having functional groups reacting with the polyamide resin and, if necessary, an inorganic filler (C) is coated with a thermoplastic resin elastomer (D) which is compatible with the thermoplastic resin composition which is the above-mentioned component (B); ② the coated polyamide molding product mentioned in the above ①, wherein the polyamide resin (A) is a polyamide resin containing crystalline polyamide resin (a) and amorphous polyamide resin (b); ③ the coated polyamide molding product mentioned in the above ①, wherein the polyamide molding product obtained from a polyamide resin composition containing 0~200 part (s) by weight of the inorganic filler (C) to 100 parts by weight of the composition comprising 90~50% by weight of the polyamide resin (A) and 10~50% by weight of the thermoplastic resin composition (B) having functional groups reacting with the polyamide resin is coated with the thermoplastic resin elastomer (D) which is compatible with the thermoplastic resin composition which is the above-mentioned component (B); ④ the coated polyamide molding product mentioned in the above ①, wherein the thermoplastic resin composition (B) is a single resin or a blend of two or more kinds of resins selected from general-purpose resin, engineering plastic, soft resin and thermoplastic elastomer; and ⑤ the coated polyamide molding product mentioned in the above ①, wherein the thermoplastic resin elastomer (D) has a hardness of 90~30° according to the JIS-A hardness.

DETAILED DESCRIPTION OF THE INVENTION AND PREFERRED EMBODIMENTS

Figure 1:
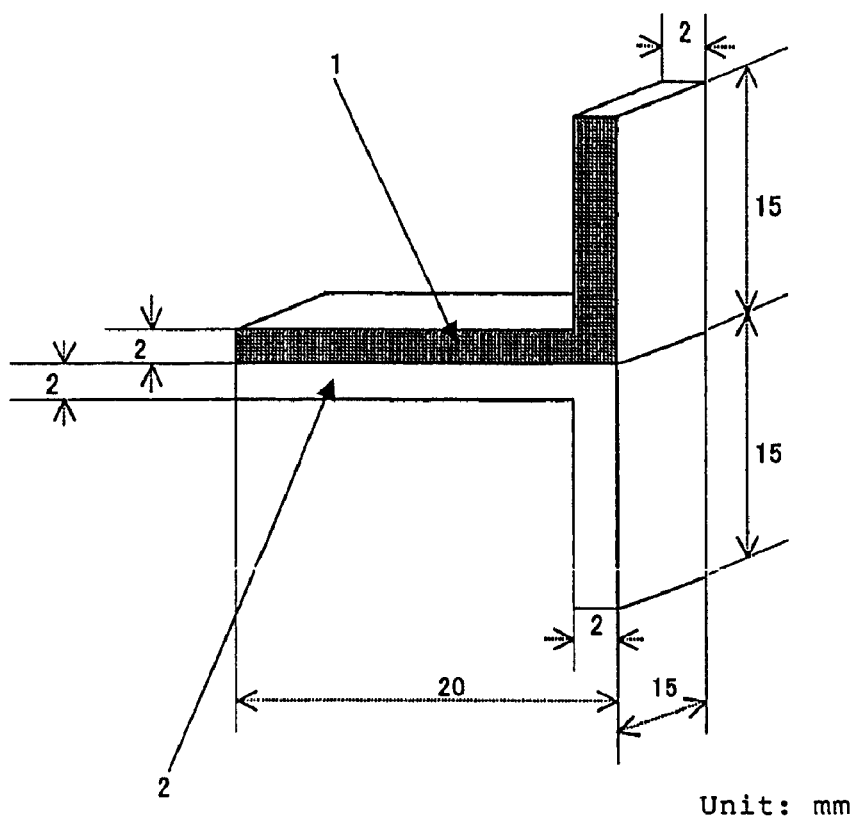
FIG. 1 is an oblique view of a sample for evaluation of the coated polyamide molding product according to the present invention. In the drawing, 1 is a thermoplastic resin elastomer (injection molding of the secondary side) and 2 is a polyamide resin (injection molding of the primary side).

Hereinafter, the present invention will be illustrated in detail.

The polyamide resin (A) which is used in the present invention is that which has an acid amide bond (—CONH—) in a molecule. To be more specific, there may be exemplified polymer or copolymer obtained from ε-caprolactam, 6-aminocaproic acid, ω-enantholactam, 7-aminoheptanoic acid, 11-aminoundecanoic acid, α-aminononanoic acid, α-pyrrolidone, α-piperidone, etc.; polymer or copolymer obtained by polycondensation of a diamine such as hexamethylenediamine, nonamethylenediamine, undecamethylenediamine, dodecamethylenediamine, m-xylylenediamine, etc. with a dicarboxylic acid such as terephthalic acid, isophthalic acid, adipic acid, sebacic acid, etc.; and a blended product thereof although the present invention is not limited thereto. Among the above-mentioned polyamide resins, those having a number-average molecular weight of 7,000~30,000 are preferably used in the present invention.

In the present invention, it is preferred that the polyamide resin (A) contains the crystalline polyamide resin (a) and the amorphous polyamide resin (b). The said crystalline polyamide resin (a) means a resin which has melting point and glass transition point and there may be exemplified a resin having a crystal fusing calorie of 4 J/g or more upon rising at 20° C./minute by a differential scanning calorimeter (DSC) after the resin is heated at 160° C. for 1 hour. To be specific, there may be exemplified Nylon 6 (calorie=52 J/g), Nylon 66 (calorie=65 J/g), Nylon 6/Nylon 66 copolymer (calorie=40 J/g), Nylon 46 (calorie=90 J/g), Nylon 12 (calorie=38 J/g), Nylon 6T/Nylon 66 copolymer (calorie=48 J/g) and Nylon MXD-6 (calorie=40 J/g) and, in the present invention, Nylon 6 and Nylon 66 are preferred.

The above-mentioned amorphous polyamide resin (b) means a resin which has glass transition point and there may be exemplified a resin having a crystal fusing calorie of 3 J/g or less upon rising at 20° C./minute by a differential scanning calorimeter (DSC) after the resin is heated at 160° C. for 1 hour in which the resin having a number-average molecular weight is 7,000~30,000 is preferably used.

With regard to the above amorphous polyamide resin, there may be specifically exemplified Nylon 6T/Nylon 66 copolymer (calorie=2 J/g), Nylon 6T/Nylon 6I copolymer (calorie=0.5 J/g) and Nylon TMD-T/Nylon 6 copolymer (calorie=0.7 J/g) and, in the present invention, Nylon 6T/Nylon 66 copolymer is preferred and a blend with various Nylon copolymers is preferred as well.

The preferred blending ratio of the crystalline polyamide resin (a) to the amorphous polyamide resin (b) is 90~50% by weight of the crystalline polyamide (a) and 10~50% by weight of the amorphous polyamide (b) and, more preferably, it is 85~65% by weight of the crystalline polyamide (a) and 15~35% by weight of the amorphous polyamide (b) to the polyamide resin composition although the present invention is not limited thereto.

The thermoplastic resin composition (B) used in the present invention is prepared by kneading a single resin or a blend of two or more kinds of resins selected from general-purpose resin, engineering plastic, soft resin, thermoplastic elastomer and the like.

To be more specific, there may be exemplified various general-purpose resins, engineering plastics, soft resins and thermoplastic elastomers including:

general-purpose resin of an olefin type such as various kinds of polyethylene, isotactic polypropylene, syndiotactic polypropylene, polybutene-1,4-methylpentene-1, etc.;

general-purpose resin of a styrene type such as polystyrene, syndiotactic polystyrene, AS resin, ABS resin, polystyrene-modified polyphenylene ether resin, etc.;

engineering plastic such as PMMA resin, PET resin, PBT resin, polycarbonate, polyarylate, polyacetal resin, etc.;

soft resin such as ethylene copolymer (e.g., ethylene/propylene copolymer, ethylene/butene-1 copolymer, ethylene/octane-1 copolymer, ethylene/hexene-1 copolymer, ethylene/4-methylpentene-1 copolymer, ethylene/cyclic olefin copolymer, etc.), propylene copolymer (e.g., propylene/ethylene copolymer, propylene/butene-1 copolymer, etc.), butene-1 copolymer (e.g., butene-1/ethylene copolymer, butene-1/propylene copolymer, etc.), acrylic copolymer (e.g., ethylene/acrylic acid copolymer, ethylene/ethyl acrylate copolymer, ethylene/methacrylic acid copolymer, ethylene/methyl methacrylate copolymer, etc.), ionomer resin, ethylene/vinyl acetate copolymer, etc.;

various kind of thermoplastic elastomers of an olefin type such as thermoplastic elastomer of an olefin type (TPO) in a dynamic cross-linking type, TPO of a blended type, TPO of a polymerized type, etc.;

thermoplastic elastomer such as various kinds of thermoplastic elastomers of a styrene type (to be more specific, SBS, SIS, SEBS, SEPS, vinyl SEPS, hydrogenated SBR, etc.), thermoplastic elastomer of an urethane type, thermoplastic elastomer of a polyester type, thermoplastic elastomer of a polyamide type, etc.;

and the like although the thermoplastic resin composition of the present invention is not limited thereto.

It is desirable that the compounding amount of the above thermoplastic resin composition is 10~50% by weight, preferably 10~40% by weight or, particularly preferably, 15~35% by weight. When the compounding amount is less than 10% by weight, thermally fusing property with a thermoplastic resin is poor while, when it is more than 50% by weight, there is a possibility of resulting in a phase inversion with a polyamide resin whereby they are not preferred.

In order to enhance the compatibility with the polyamide resin (A), the above-mentioned thermoplastic resin composition (B) has a functional group which reacts with the polyamide resin. Specific examples of the functional group reacting with the polyamide resin are carboxylic acid group, acid anhydride group, epoxy group, oxazoline group, amino group and isocyanate group and, among them, acid anhydride group is most reactive and is particularly preferred.

With regard to a method for the manufacture of the thermoplastic resin composition which is the component (B) and has a functional group which is reactive with the polyamide resin, there are available a method where a compound having the above-mentioned functional group is compounded during the manufacture of the thermoplastic resin composition and is made to react with the constituting component of the thermoplastic resin composition, a method where pellets of the thermoplastic resin composition and a compound having the above functional group are mixed and the mixture is kneaded in an extruder or the like so as to react with the constituting component of the thermoplastic resin composition, etc. and, in the present invention, any of the methods may be adopted.

With regard to the inorganic filler (C) used in the present invention, its specific examples are fibrous inorganic reinforcing agent such as glass fiber, carbon fiber, ceramic fiber, various kinds of whiskers, needle-like wollastonite, etc. and powdery inorganic filler such as silica, alumina, talc, kaolin, quartz, powdery glass, mica, graphite, etc. Each of those inorganic fillers may be used solely or two or more thereof may be used jointly. Further, such an inorganic filler may be treated with a silane coupling agent as a surface-treating agent and aminosilane is particularly preferred.

Compounding amount of the above inorganic filler (C) is 0~200 part(s) by weight to 100 parts by weight of the composition comprising the polyamide resin (A), the polyolefin resin (B) and/or the modified polyolefin resin and is preferably 0~160 part(s) by weight or, particularly preferably, 0~150 part(s) by weight. When the above inorganic filler is more than 200 part(s) by weight, luster spots are resulted on the appearance of the molding product and the appearance becomes bad whereby that is not preferred.

The thermoplastic resin elastomer (D) used in the present invention is a resin having a good recovery of elasticity which is compatible with the thermoplastic resin composition (B) being mainly composed of hard segment and soft segment and includes block copolymer, graft copolymer, partially cross-linked polymer, blend of homopolymer having a good compatibility, etc.

Incidentally, it is important in the present invention to select a combination where the thermoplastic resin composition (B) and the thermoplastic resin elastomer (D) are compatible and, with regard to a compatible combination, it may be one of the criteria that their solubility parameters (SP values) are 0.5 or less although, finally, it is necessary to knead both resins for confirming their compatibility.

Specific examples of the component (D) are a thermoplastic elastomer such as thermoplastic elastomer of an olefin type (TPO) (e.g., dynamically cross-linked thermoplastic elastomer, TPO in a blended type, TPO in a polymerized type, etc.), a thermoplastic elastomer of a styrene type (e.g., SBS, SIS, SEBS, SEPS, vinyl SEPS, hydrogenated SBR, etc.), a thermoplastic elastomer of a urethane type, a thermoplastic elastomer of a polyester type, a thermoplastic elastomer of a polyamide type, etc.; and an ethylenic copolymer having much copolymer component such as ethylene/propylene copolymer, ethylene/butene-1 copolymer and ethylene/octene-1 copolymer and a blend of such a copolymer with a homopolymer which is compatible therewith.

With regard to the above component (D) in the present invention, it is preferred that hardness of the component (D) is low so that it is coated by thermal fusion on the surface of a polyamide molding product having a high rigidity whereby gripping property, packing/sealing property and vibration cushioning property are achieved.

Preferred surface hardness in terms of the JIS-A hardness is 90~30° or, more preferably, 80~35°. When the hardness is more than 90°, gripping property and sealing property are poor while, when it is less than 30°, heat resistance and molding ability of the thermoplastic resin is elastomer (D) are poor whereby its coating and molding on the polyamide resin is difficult. Such a thing is not preferred.

There is no particular limitation in a method for the manufacture of the coated polyamide molding product in accordance with the present invention but all of the known methods where the thermoplastic resin elastomer (D) is coated or layered on the polyamide molding product followed by subjecting to a thermal fusion are included. With regard to specific examples of the manufacturing methods, there are a "dichromatic injection molding method" where, after the polyamide resin is subjected to an injection molding, the metal mold is immediately rotated and the thermoplastic resin elastomer (D) is further subjected to an injection molding on the whole or partial surface of the polyamide molding product; an "outsert or insert molding method" where a previously molded polyamide resin molding product is placed in a cavity of a metal mold and an additional molding is carried out on the whole or partial surface of the molding product; a "bilayer extrusion method" where the polyamide resin and the thermoplastic resin elastomer (D) are extruded at the same time using a two-layer extrusion molding machine to carry out a thermal fusion; a "thermal lamination method" where a sheet or a molding product of a previously molded thermoplastic resin elastomer (D) is laminated on the surface of a previously molded polyamide molding product and then thermally fused by an ultrasonic fusing machine or a vibration fusing machine; and the like although the present invention is not limited thereto.

In the coated polyamide molding product of the present invention, the polyamide molding product having high strength and rigidity is layered on and thermally fused with the soft resin which has good gripping property, sealing property and vibration cushioning property and shows an entirely difference from the polyamide resin in the characteristics without the use of special adhesives whereupon it is now possible to manufacture a compounded molding product having many functions at a low cost.

EXAMPLES

Now the present invention will be specifically illustrated by way of the following Examples and Comparative Examples although the present invention is not limited to those examples. Incidentally, the compatibility of the component (B) with the component (D) and the fusing strength (adhesive strength) of the coated molding product were measured and evaluated by the following release test.

Compatibility of the component (B) with the component (D): Resins of the both components were mixed in a ratio of 50/50, kneaded and made into pellets. They were subjected to an injection molding to manufacture a flat plate of 1 mm and the release phenomenon when the molding product was bent was evaluated by naked eye.

o: released; x: not released

Releasing strength: In the following samples for the evaluation by the dichromatic molding method and the outsert molding method, the polyamide resin and the styrene soft resin were pulled in a direction of 90° and the releasing strength was measured. In the case of the samples for the evaluation manufactured by a thermal lamination molding method, the polyamide resin and the thermoplastic resin elastomer (D) were pulled in a direction of 180° and the releasing strength was measured. In both cases, the tensile speed was 100 mm/minute.

o: releasing strength being 1.0 kg/15 mm or more
x: releasing strength being about 0 kg/15 mm or less Manufacturing Example 1
(Manufacture of Polyamide Resin Ny-1)

As the polyamide resin, 70% by weight of Ny-6 (Nylon T-803 manufactured by Toyo Boseki Kabushiki Kaisha; number-average molecular weight: 12,000) and 30% by weight of acid-modified polypropylene (MMP-006 manufactured by Grand Polymer K. K.) were mixed, kneaded by a biaxial extruder at the cylinder temperature of 250° C. and made into pellets.

Manufacturing Example 2
(Manufacture of Polyamide Resin Ny-2)

As the polyamide resin, 50% by weight of Ny-6 (Nylon T-803 manufactured by Toyo Boseki Kabushiki Kaisha; number-average molecular weight: 12,000), 20% by weight of acid-modified polypropylene and 30% by weight of glass fiber (RES-03-TP64 manufactured by Nippon Glass Fiber K. K.) were mixed, kneaded by a biaxial extruder at the cylinder temperature of 260° C. and made into pellets.

Manufacturing Example 3
(Manufacture of Polyamide Resin Ny-3)

Ethylene/octene-1 copolymer (Engage 8402; manufactured by Dow Chemical) was mixed with 0.5 part by weight of maleic acid anhydride and 0.2 part by weight of dicumyl peroxide and kneaded by a biaxial extruder at the cylinder temperature of 220° C. to manufacture an acid-modified ethylene/octene-1 copolymer. This acid-modified product (30% by weight) and 70% by weight of Ny-6 were mixed, kneaded by a biaxial extruder at the cylinder temperature of 250° C. and made into pellets.

Manufacturing Example 4
(Manufacture of Polyamide Resin Ny-4)

Polybutylene terephthalate (PBT; Tufpet N-1000 manufactured by Mitsubishi Rayon) was mixed with 0.5 part by weight of maleic acid anhydride and 0.2 part by weight of dicumyl peroxide and kneaded by a biaxial extruder at the cylinder temperature of 250° C. to manufacture an acid-modified PBT. This acid-modified PBT (30% by weight) and 70% by weight of Ny-6 were mixed, kneaded by a biaxial extruder at the cylinder temperature of 250° C. and made into pellets.

Manufacturing Example 5
(Manufacture of Polyamide Resin Ny-5)

As the polyamide resin, 70% by weight of Ny-6 and 30% by weight of acid-modified styrene/ethylene/butylene/styrene copolymer (SEBS; Tuftec M-1943 manufactured by Asahi Kasei), kneaded by a biaxial extruder at the cylinder temperature of 250° C. and made into pellets.

Manufacturing Example 6
(Manufacture of Polyamide Resin Ny-6)

The same operation as in Manufacturing Example 1 was carried out using only Ny-6 (Toyobo Nylon manufactured by Toyo Boseki Kabushiki Kaisha; T-803) to give pellets.

Manufacturing Example 7

Thermoplastic resin elastomers EP-1~EP-5 are as follows.

EP-1: Hydrogenated styrene/butadiene copolymer (HSBR; Dynaron 1320P manufactured by JSR K. K.; hardness: 39 A);

EP-2: Thermoplastic elastomer of an olefin type (TPO; Santoprene 101-55 manufactured by AES K. K.; hardness: 55 A);

EP-3: Ethylene/octene-1 copolymer (Engage 8180 manufactured by Dow Chemical; hardness: 66 A);

EP-4: Thermoplastic elastomer of a polyester type (TPEE; Pelprene P-30B manufactured by Toyo Boseki Kabushiki Kaisha; hardness: 85 A); and EP-5: Styrene/ethylene/propylene/styrene copolymer (SEPS; Septon 2062 manufactured by Kuraray Co., Ltd.; hardness: 39 A).

Examples 1, 2, 4 and 5 and Comparative Examples 1, 3 and 4 (Dichromatic molding method)

A metal mold having a shape as shown in FIG. 1 was used and each of the above-mentioned polyamide resins was molded using a dichromatic molding machine of a core rotation system (Type KS-2C300 manufactured by K. K. Takahashi Seiki Kogyosho) at the metal mold temperature of 40° C. where the cylinder temperature in the injection molding at the primary side was 260° C. and various thermoplastic resin elastomers as shown in Table 1 were molded by the injection molding machine at the secondary side at the cylinder temperature of 230° C. whereupon molding products for evaluation were prepared.

Examples 3, 6 and 7 and Comparative Example 2 (Outsert molding method)

An injection molding at the primary side was carried out using the above-mentioned dichromatic molding machine, the injection molding product at the primary side was molded using a polyamide resin and the product was taken out from the metal mold and subjected to keeping the warmth and preventing the moisture absorption in a drier of about 100° C. Then, a previously-molded polyamide molding product was attached to the cavity of the primary side of the metal mold of the injection molding machine of the secondary side and a layered molding of the thermoplastic resin elastomer was carried out to prepare a molding product for evaluation. Conditions for the molding are as same as those in the dichromatic molding method.

Result of the evaluation of Examples 1~7 and Comparative Examples 1~4 is shown in Table 1.

TABLE 1

| | Examples | | | | | | | Comparative Examples | | | |
|---|---|---|---|---|---|---|---|---|---|---|---|
| | 1 | 2 | 3 | 4 | 5 | 6 | 7 | 1 | 2 | 3 | 4 |
| Polyamide Resin Compositions | | | | | | | | | | | |
| Ny-1 | ○ | | | | ○ | | | | | | |
| Ny-2 | | ○ | | | | | | | | | |
| Ny-3 | | | ○ | | | | | | | | |
| Ny-4 | | | | ○ | | | | | | ○ | ○ |
| Ny-5 | | | | | | ○ | ○ | | | | |
| Ny-6 | | | | | | | | ○ | ○ | | |
| Thermoplastic Resin Elastomers | | | | | | | | | | | |
| EP-1 | ○ | | | | | | | | | | |
| EP-2 | | ○ | | | | | | ○ | ○ | | ○ |
| EP-3 | | | ○ | | | | | | | ○ | |
| EP-4 | | | | ○ | | | | | | | |
| EP-5 | | | | | ○ | ○ | | | | | |
| Molding Methods | | | | | | | | | | | |
| Dichromatic Molding | ○ | ○ | | ○ | ○ | | | ○ | | ○ | ○ |
| Outsert Molding | | | ○ | | | ○ | ○ | | ○ | | |
| Compatibility | ○ | ○ | ○ | ○ | ○ | ○ | ○ | — | — | x | x |
| Adhesive Strength | ○ | ○ | ○ | ○ | ○ | ○ | ○ | x | x | x | x |

As will be apparent from Examples 1~7, it is noted that the interlayer of the coated polyamide molding product of the present invention has a good thermal adherence and is strongly bonded giving a durable coated polyamide molding product. On the other hand, in Comparative Examples 1~2, there is no thermal fusion at all in the interlayer between the thermoplastic resin elastomer and the polyamide resin composition where no thermoplastic resin composition having a polar group reacting with polyamide resin is compounded. Further, as shown in Comparative Examples 3~4, when the compatibility of the thermoplastic resin composition with the thermoplastic resin elastomer is poor, the thermal fusion in the interlayer is bad and it is not possible to manufacture a durable coated polyamide molding product.

Manufacturing Example 8
(Manufacture of Polyamide Resin Ny-7)

There were mixed 50% by weight of Ny-6 (Nylon T-803 manufacture by Toyo Boseki Kabushiki Kaisha; number-average molecular weight: 12,000) as the crystalline polyamide resin, 15% by weight of Grivory G 21 (6T/6I copolymerized Nylon manufactured by EMS) as the amorphous polyamide resin and 35% by weight of an acid-modified polypropylene (MMP-006 manufactured by Grand Polymer K. K.) followed by kneading using a biaxial extruder at the cylinder temperature of 250° C. whereupon pellets were prepared.

Manufacturing Example 9
(Manufacture of Polyamide Resin Ny-8)

There were mixed 55% by weight of Ny-6 (Nylon T-803 manufacture by Toyo Boseki Kabushiki Kaisha) as the crystalline polyamide resin, 15% by weight of G 21 manufactured by EMS which was the same one as in Manufacturing Example 8 as the amorphous polyamide resin and 30% by weight of an acid-modified polypropylene (MMP-006 manufactured by Grand Polymer K. K.) followed by kneading using a biaxial extruder at the cylinder temperature of 250° C. whereupon pellets were prepared.

Manufacturing Example 10
(Manufacture of Polyamide Resin Ny-9)

There were mixed 35% by weight of Ny-6 (Nylon T-803 manufacture by Toyo Boseki Kabushiki Kaisha) as the crystalline polyamide resin, 15% by weight of G 21 manufactured by EMS which was the same one as in Manufacturing Example 8 as the amorphous polyamide resin, 20% by weight of an acid-modified polypropylene and 30% by weight of glass fiber (RES-03-TP64 manufactured by Nippon Glass Fiber K. K.) followed by kneading using a biaxial extruder at the cylinder temperature of 260° C. whereupon pellets were prepared.

Manufacturing Example 11
(Manufacture of Polyamide Resin Ny-10)

Ethylene/octene-1 copolymer (Engage 8402; manufactured by Dow Chemical) was mixed with 0.5 part by weight of maleic acid anhydride and 0.2 part by weight of dicumyl peroxide and kneaded by a biaxial extruder at the cylinder temperature of 220° C. to manufacture an acid-modified ethylene/octene-1 copolymer. This acid-modified product (30% by weight) was mixed with 55% by weight of Ny-6 as a crystalline polyamide and 15% by weight of G 21 manufactured by EMS which was as same as that in Manufacturing Example 8 as an amorphous polyamide resin and kneaded by a biaxial extruder at the cylinder temperature of 250° C. whereupon pellets were prepared.

Manufacturing Example 12
(Manufacture of Polyamide Resin Ny-11)

Polybutylene terephthalate (PBT; Tufpet N-1000 manufactured by Mitsubishi Rayon) was mixed with 0.5 part by weight of maleic acid anhydride and 0.2 part by weight of dicumyl peroxide and kneaded by a biaxial extruder at the cylinder temperature of 250° C. to manufacture an acid-modified PBT. This acid-modified PBT (30% by weight) was mixed with 50% by weight of Nylon 6 as a crystalline polyamide resin and 20% by weight of G 21 manufactured by EMS which was as same as that in Manufacturing Example 8 as an amorphous polyamide resin and kneaded by a biaxial extruder at the cylinder temperature of 250° C. whereupon pellets were prepared.

Manufacturing Example 13
(Manufacture of Polyamide Resin Ny-12)

There were mixed 60% by weight of Ny-6 as a crystalline polyamide resin, 10% by weight of G 21 of EMS which was as same as that in Manufacturing Example 8 as an amorphous polyamide resin and 30% by weight of an acid-modified styrene/ethylene/butylene/styrene copolymer (SEBS manufactured by Asahi Kasei; Taftec M-1943) and the mixture was kneaded by a biaxial extruder at the cylinder temperature of 250° C. whereupon pellets were prepared.

Examples 8, 9, 10, 12 and 13 and Comparative Examples 5 and 6 (Dichromatic Molding Method)

A metal mold in a shape as shown in FIG. 1 was used and each of the above-mentioned polyamide resins was molded using a dichromatic molding machine of a core rotation system (Type KS-2C300 manufactured by K. K. Takahashi Seiki Kogyosho) at the metal mold temperature of 40° C. where the cylinder temperature in the injection molding at the primary side was 260° C. and various thermoplastic resin elastomers as shown in Table 2 were molded by the injection molding machine at the secondary side at the cylinder temperature of 230° C. whereupon molding products for evaluation were prepared.

Examples 11, 14 and 15 (Outsert Molding Method)

An injection molding at the primary side was carried out using the above-mentioned dichromatic molding machine, the injection molding product at the primary side was molded using a polyamide resin and the product was taken out from the metal mold and subjected to keeping the warmth and preventing the moisture absorption in a drier of about 100° C. Then, a previously-molded polyamide molding product was attached to the cavity of the primary side of the metal mold of the injection molding machine of the secondary side and a layered molding of the thermoplastic resin elastomer was carried out to prepare a molding product for evaluation. Conditions for the molding are as same as those in the dichromatic molding method.

Result of the evaluation of Examples 8~15 and Comparative Examples 5 and 6 is shown in Table 2.

TABLE 2

|  | Examples | | | | | | | | Comparative Examples | |
|---|---|---|---|---|---|---|---|---|---|---|
|  | 8 | 9 | 10 | 11 | 12 | 13 | 14 | 15 | 5 | 6 |
| Polyamide Resin Compositions | | | | | | | | | | |
| Ny-7 | ○ | | | | | | | | | |
| Ny-8 | | ○ | | | | | ○ | | | |
| Ny-9 | | | ○ | | | | | | | |
| Ny-10 | | | | ○ | | | | | | |
| Ny-11 | | | | | ○ | | | | ○ | ○ |
| Ny-12 | | | | | | ○ | | ○ | | |
| Thermoplastic Resin Elastomers | | | | | | | | | | |
| EP-1 | ○ | | | | | | | | | |
| EP-2 | | ○ | ○ | | | | ○ | | ○ | |
| EP-3 | | | | ○ | | | | | | ○ |
| EP-4 | | | | | ○ | | | | | |
| EP-5 | | | | | | ○ | | ○ | | |
| Molding Methods | | | | | | | | | | |
| Dichromatic Molding | ○ | ○ | ○ | | ○ | ○ | | | ○ | ○ |
| Outsert Molding | | | | ○ | | | ○ | ○ | | |
| Compatibility | ○ | ○ | ○ | ○ | ○ | ○ | ○ | ○ | x | x |
| Adhesive Strength | ○ | ○ | ○ | ○ | ○ | ○ | ○ | ○ | x | x |

As will be apparent from Examples 8~15, it is noted that the interlayer of the coated polyamide molding product of the present invention has a good thermal adherence and is strongly bonded giving a durable coated polyamide molding product. Further, when compatibility of the thermoplastic resin composition with the thermoplastic resin elastomer is poor as shown in Comparative Examples 5 and 6, the thermal fusion property of the interlayer is bad and it is not possible to manufacture a durable coated polyamide molding product.

The coated polyamide molding product of the present invention has good strength, rigidity and shock resistance and is able to give a layered molding product having the surface characteristics such as gripping property and packing/sealing property at a low cost whereby the product can be utilized in broad fields of use such as electric tools, fishing tackles, sporting and amusement goods, auto parts and office supplies and greatly contributes in industry.

What is claimed is:

1. A polyamide molding product coated with a thermoplastic elastomer, wherein a polyamide molding product is obtained from a polyamide resin composition comprising (A) a polyamide resin, (B) a thermoplastic resin composition having functional groups which react with a polyamide resin, and, if necessary, (c) an inorganic filler, and the polyamide molding product is coated with (D) a thermoplastic elastomer which is compatible with the thermoplastic resin composition (b).

2. A polyamide molding product coated with a thermoplastic elastomer as defined in claim 1, wherein the polyamide resin (A) is comprising (a) crystalline polyamide resin and (b) amorphous polyamide resin.

3. A polyamide molding product coated with a thermoplastic elastomer as defined in claim 1, wherein the polyamide molding product obtained from a polyamide resin composition containing 0–200 part(s) by weight of the inorganic filler (C) to 100 parts by weight of the polyamide resin composition, and the polyamide resin composition is comprising 90–50 wt % of the polyamide resin (A) and 10 to 50 wt % of the thermoplastic resin composition (B).

4. A polyamide molding product coated with a thermoplastic elastomer as defined in claim 1, wherein (B) the thermoplastic resin composition is a single resin or a blend of two or more kinds of resins selected from a olefin type resin, styrene type resin, engineering plastic, soft resin and thermoplastic elastomer.

5. A polyamide molding product coated with a thermoplastic elastomer as defined in claim 1, wherein the thermoplastic resin elastomer (D) has a hardness of 90–30-degree according to the JIS-A hardness.

* * * * *